3,529,124
AUTOMATIC VOLTAGE CONTROL FOR ELECTRIC ARC DISCHARGE DEVICE
Douglas I. MacFarlane and Robert F. Keating, Woodland Hills, Calif., assignors to North American Rockwell Corporation
Filed Jan. 15, 1968, Ser. No. 697,712
Int. Cl. B23k 9/12
U.S. Cl. 219—125     10 Claims

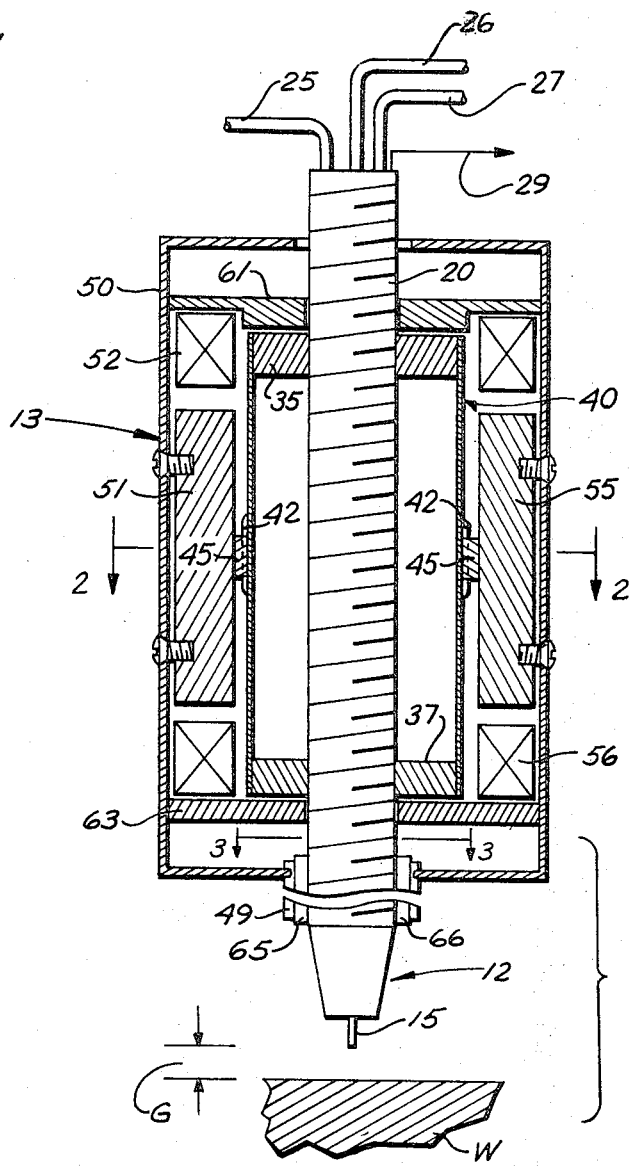
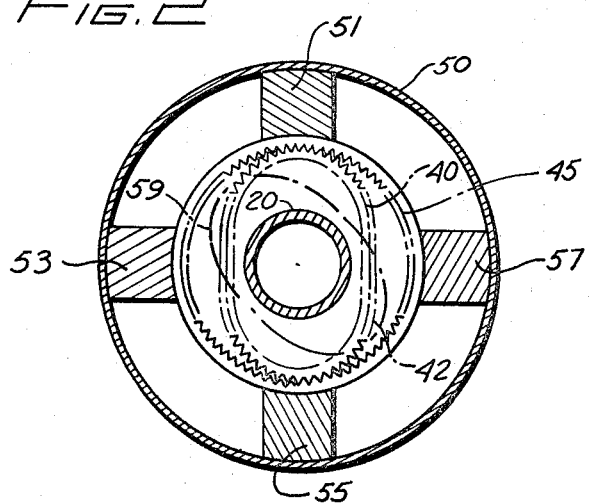
FIG. 1
FIG. 2
INVENTORS.
ROBERT F. KEATING
DOUGLAS I. MacFARLANE
BY
John E. Kelly
ATTORNEY Sept. 15, 1970     D. I. MacFARLANE ET AL     3,529,124
AUTOMATIC VOLTAGE CONTROL FOR ELECTRIC ARC DISCHARGE DEVICE
Filed Jan. 15, 1968     2 Sheets-Sheet 2
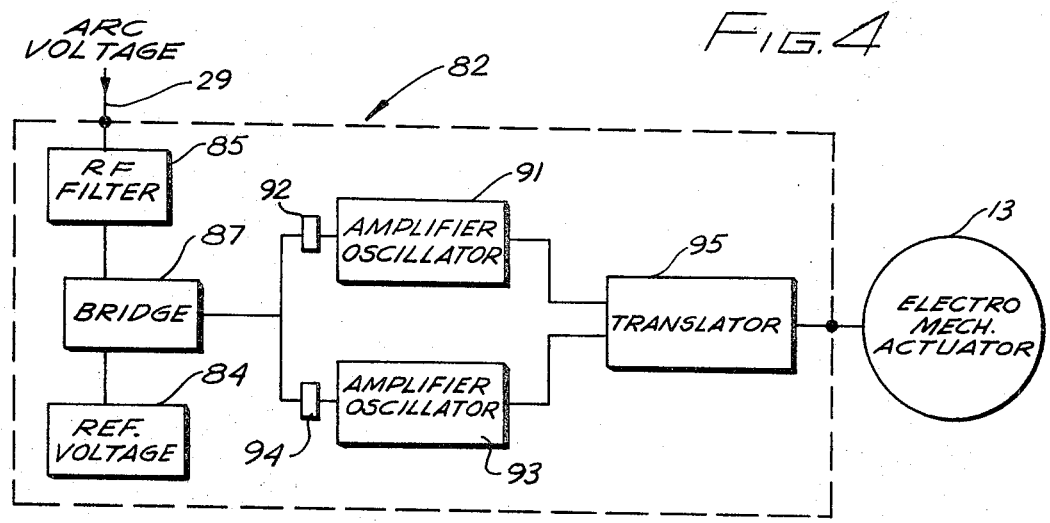
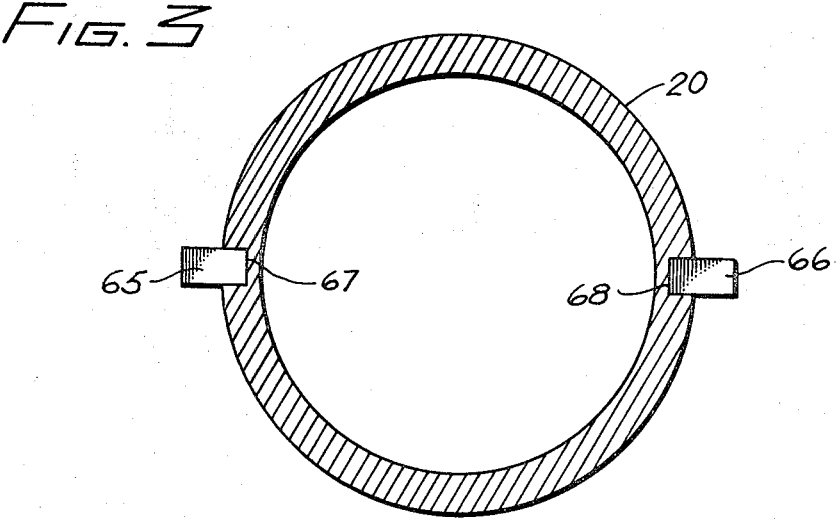
INVENTORS.
ROBERT F. KEATING
DOUGLAS I. MacFARLANE
BY
John E. Kelly
ATTORNEY United States Patent Office 3,529,124
Patented Sept. 15, 1970

ABSTRACT OF THE DISCLOSURE

Apparatus for maintaining a constant predetermined arc voltage and arc gap between the electrode of an electrical arc discharge device such as a welding torch and a workpiece. The welding torch is connected to an electromechanical actuator by a coupling which allows virtually no backlash as the torch is lowered toward or raised from the workpiece to reestablish a desired arc gap. The arc gap is automatically restored to the desired predetermined length by feeding back arc voltage information to an electric circuit that transmits variable frequency pulses to the electromechanical actuator which then positionally adjusts the torch.

BACKGROUND OF THE INVENTION

This invention relates to electrical arc welding apparatus and more specifically to a quick response electromechanical system for maintaining a constant arc voltage between the electrode of a welding torch and a workpiece, the system being designed to virtually eliminate gear backlash in the gearing assembly.

It is well known to incorporate electromechanical systems in electrical arc welding devices for automatically advancing and retracting the welding electrode toward and away from a workpiece to be welded. Some of these systems monitor the arc voltage which is fed back to an electrical circuit that in turn operates to adjust the electrode position.

It is known to equip this type of welding apparatus with an electromechanical system for maintaining a constant arc gap and arc voltage between the tip of a consumable electrode and the workpiece to be welded (e.g., U.S. Pat. No. 1,963,915 to Kennedy et al. and U.S. Pat. No. 3,209,121 to Manz). It is also known to use a two phase induction motor coupled to a complex multi-gear electrode holding assembly designed to advance and retract a non-consumable electrode to and from a workpiece to be welded. A control circuit senses the arc voltage and then operates the motor to adjust the relative position between the electrode and workpiece (e.g., U.S. Pat. No. 2,906,859 to Steele). Welding efficiency of these prior art arc welding assemblies suffer from low speed of response in correcting variable arc voltages and gaps and from gear mismatch with resulting backlash when the electrode holder is braked, abruptly move from a stationary position, or reversed in direction.

SUMMARY OF THE INVENTION

Briefly described, the present invention contemplates an electrical arc discharge device, capable of maintaining a constant arc voltage and arc gap between the device which may be welding apparatus and the workpiece. During operation, variable arc voltage information is fed back to an electrical circuit that compares the existing arc voltage with a reference voltage. Voltage differential is used to generate a series of electrical pulses in proportion to the voltage differential that are transmitted to an electromechanical actuator which functions to restore the arc gap to the predetermined desired arc gap length. As the gap error becomes larger, the rate of responses by the electrical circuit and electromechanical actuator correspondingly become greater to quickly correct the arc gap variations. The electromechanical actuator includes a stator characterized by a plurality of pairs of diametrically opposed electromagnets associated with windings that receive the electric pulses generated by the electric circuit. By sequentially energizing successive pairs of electromagnets in one direction a magnetic field is generated in either a clockwise or counterclockwise direction. By sequentially energizing the electromagnets in the opposite direction then the magnetic field is caused to revolve in the other direction. Fixed to the stator is a rigid ring gear formed on its interior periphery with teeth. Positioned concentrically within the ring gear is a flexible annular gear formed on its exterior surface with teeth that are fewer in number than the teeth of the rigid gear. The inner gear assembly is constructed of magnetizable material and the teeth of diametrically opposed sections are caused to deflect and intermesh with the rigid gear under the influence of the magnetic field. As the magnetic field revolves then the inner gear is caused to rotate relative to the rigid gear. The inner gear is fixed to the exterior periphery of an intermediate portion of a flexible tube. At the opposite ends of the tube is fixed a pair of internally threaded nuts which are interengaged with a worm gear. The worm gear is connected to the welding torch. Rotary movement by the inner gear is transmitted by way of the nuts to the worm gear causing the electrode to be either raised from or lowered toward the workpiece to regulate the arc gap. The flexible tube is prevented from axial movement by a stop and hence is confined to rotary movement. Conversely the worm gear is prevented from rotary movement by way of a pair of keys inserted in keyways formed in the worm gear. The worm gear is capable of only axial displacement. As the arc gap error becomes larger then the frequency of generated pulses becomes correspondingly larger to increase the rotational rate of the magnetic field. This in turn results in quicker axial displacement by the welding torch and its electrode to reestablish the desired gap length.

IN THE DRAWINGS

The above identified and additional advantages and unique aspects of the present invention will be fully appreciated upon studying the detailed description in conjunction with the drawings in which:

FIG. 1 is a partially sectional, longitudinal view, showing the components of the electromechanical actuator and welding torch;

FIG. 2 is a sectional view taken alone line 2—2 of FIG. 1 showing portions of the rigid ring gear and magnetizable inner gear interengaged under the influence of the magnetic field;

FIG. 3 is a view taken along line 3—3 of FIG. 1, showing how the key-ways formed in the worm gear and keys fixed to a frame coact to prevent rotational movement of the welding torch;

FIG. 4 is a schematic illustration of the electric circuit that compares a reference and arc voltage and then generates pulses to be used in correcting arc gap variations.

DESCRIPTION OF THE PREFERRED EMBODIMENT

Referring now to the drawings for a detailed explanation of the advantages and unique aspects of this invention, FIG. 1 illustrates an electric arc welding assembly 10 having an electromechanical actuator 13 and a welding torch 12 incorporating a conventional welding electrode 15. Electrode 15 may, for example, be non-consumable and constructed from tungsten. The free tip of electrode 15 is spaced by a gap G from the workpiece W to be welded. As shall be explained, the electrical potential between electrode 15 and workpiece W is constantly monitored and fed back by an electrical line 29 to an electrical circuit (to be described in detail) which functions to maintain a constant arc voltage and arc gap G between electrode 15 and workpiece W. It should be noted that electrode 15, rather than being used for welding purposes, could also be incorporated in an electrical discharge machining (EDM) system.

EDM systems remove metal by spark erosion. Molten puddles developed when the arc contacts the metal are washed away when the arc is intermittently extinguished. The intermittent arcing is continued until metal is removed to the desired depth. For ease of explanation, the present invention will be explained in terms of the electrode 15 being utilized in conjunction with a welding tool rather than in an EDM tool and system.

Welding torch 12 includes a hollow worm gear 20. A shielding gas conduit 25, an electrical supply line 26 and a coolant fluid inlet conduit 27 (in communication with an outlet conduit, not shown) extend from remote supply locations (not shown) through the hollow portion of worm gear 20 and terminate in conventional connections inside torch 12. Voltage across electrode 15 and workpiece W is sensed by electrical line 29 that constantly transmits voltage information to an electrical circuit to be described in conjunction with FIG. 4. The threads of worm gear 20 are interengaged with the threads formed on the interior peripheries of a pair of rotatable nuts 35 and 37. Rotatable nuts 35 and 37 are secured to the opposing ends of a thin-walled flexible tube 40, constructed of magnetizable material. As shall be explained, tube 40 acts as a rotor and adjusts the position of worm gear 20 to correct variations of arc gap G. As best shown in FIG. 2, a series of teeth 42 encircle an intermediate portion of flexible tube 40. Teeth 42 are aligned coaxially with and interengaged teeth formed on the internal surface of a rigid gear 45. Gear 45 is stationary and rigidly attached to a housing 50 by conventional connectors (not shown). Disposed in the space between ring gear 45 and housing 50 are a plurality of equiangularly spaced conventional electromagnets 51, 53, 55 and 57. Conventional windings such as windings 52 and 56 wrapped around electromagnets 51 and 55, respectively, are employed for selective energization of the electromagnets.

When the magnetic field is zero, the inner diameter of circularly aligned teeth 45 is slightly greater than the outer diameter of circularly aligned teeth 42. To effect rotation of flexible tube 40, the only component of electro-mechanical actuator 13 that rotates is tube 40. Teeth 42 are fewer in number than the teeth of gear 45. As shall be explained, rotation of tube 40 is used to axially move worm gear 20 which in turn regulates the length of arc gap G.

Rotatable nuts 35 and 37 and therefore flexible tube 40 are stopped from axial movement by stops 61 and 63 that engage the opposite ends of tube 40. Rotation of nuts 35 and 37 cause axial movement of worm gear 20. Worm gear 20 is prevented from rotating, as best illustrated in FIG. 3, by a pair of stationary keys 65 and 66 that are inserted within and make slideable engagement with keyways 67 and 68, respectively, formed on diametrically opposed exterior portions of worm gear 20. Keys 65 and 66 which may be feather keys are rigidly fixed to housing 50 by an annular frame 49. It can now be understood that worm gear 20 is capable of only axial movement and is precluded from rotary movement because of the cooperation of the keys and keyways. Voltage across gap G is automatically regulated by axial movement of screw 20. The required movement of screw 20 is dictated by the voltage feedback information transmitted through electrical lead 29.

As the arc gap varies from its desired optimum predetermined length then the corresponding variable arc voltage is fed back through line 29 to an electrical circuit 82 schematically illustrated in FIG. 4. Circuit 82 functions to generate the necessary electrical pulses that are then fed to the electromechanical actuator 13 to correct arc gap variations. The frequency at which the pulses are generated and transmitted is proportional to the rate of change of arc voltage. Electrical circuit 82 and electromechanical actuator 13 are highly sensitive and their rate of response in correcting arc gap errors increases and decreases in proportion to the rate of change in arc voltage. Electrical circuit 82 constantly monitors the arc gap voltage that is proportional to arc gap length. When gap variations are sensed, voltage information is transmitted by feedback line 29 through an RF filter 85. RF filter 85 serves to filter out high frequency voltage, such as that which arises during arc initiation times, that could injure circuit 82. A reference voltage source 84 is preset to an optimum voltage consistent with the type of contemplated welding operation, workpiece material, etc. The reference voltage and arc voltage are fed to a bridge 87 which may, for example, be a Wheatstone bridge. Bridge 87 compares the respective voltages and measures voltage imbalance, if any. If the existing arc gap is larger than the desired arc gap, then bridge 87 will sense voltage imbalance and send signals to either amplifier oscillator 91 or amplifier oscillator 93. If, for example, the voltage imbalance is positive corresponding to a larger arc gap than desired, output current is transmitted through a positive current rectifier 92 placed immediately ahead of oscillator 91. If the gap is smaller than desired, then a negative voltage imbalance will cause output current to be transmitted through a negative current rectifier 94 placed immediately ahead of oscillator 94. A current of pulses is then transmitted from either amplifier oscillator 91 or 93 to a translator 95. Translator 95 functions to distribute the pulses to electromechanical actuator 13. The pulses are distributed to the windings of actuator 13 so as to revolve a magnetic field in either a clockwise or counterclockwise direction. Clockwise revolutions of the magnetic field may, for example, result in raising the electrode from the workpiece. As previously explained, as the compared voltage imbalance increases then a greater frequency of pulses is generated to move welding torch 12. Incorrect arc gaps become quickly adjusted to the desired gap length with minimal lag time as compared with prior art electric arc welding systems.

In view of the above description it will be understood that when arc gap G varies from its predetermined desired length, then the corresponding voltage is fed back through line 29 to the electrical circuit 82 which determines the voltage differential with respect to reference voltage 84. If the voltage differential indicates that the arc gap is greater than the desired arc gap then a stream of electrical pulses is transmitted from the electrical circuit to pairs of diametrically opposed windings of electromechanical actuator 13. For purposes of example, transmission of pulses to the windings in clockwise and counterclockwise directions result, as shall be explained in detail, in enlarging and narrowing the arc gap, respectively. When the arc gap is restored to the desired length, then the resulting zero voltage differential will automatically terminate the transmission of pulses to the windings.

As previously mentioned if the arc gap error, whether great or small, becomes larger than the rate of response of the electric circuit 82 and electromechanical actuator 13 to restore the arc gap to its intended length, also becomes greater. Increased voltage differentials automatically result in an increased frequency of transmission of the pulses.

Sequentially pulsing diametrically opposed pairs of successive windings results in a magnetic field that shifts along an arcuate path. The windings and their associated electromagnets constitute a stator for generating a magnetic field that is exerted upon the magnetizable thin-walled flexible tube 40 that acts as a rotor. Referring to FIG. 2, the magnetic field is being generated between diametrically opposed electromagnets 51 and 55 whose respective windings (not shown) are being simultaneously pulsed. The wall thickness of flexible tube 40 is sufficiently thin so that the magnetic field force deflects it into an elliptical shape, causing the teeth 42 (that are aligned with the major axis of the ellipse) of tube 40 to firmly intermesh with the teeth of rigid ring gear 45. The dot-dash line 59 shows the changed position of flexible tube 40 as the magnetic field is being shifted in a counterclockwise direction from between electromagnets 51 and 55 to between electromagnets 53 and 57 (i.e., pulses during this transition are being transmitted to the windings associated with electromagnets 53 and 57 as the magnetic field decays between electromagnets 51 and 55).

Due to the fact that (1) flexible tube 40 has fewer teeth 42 than ring gear 45 and (2) a portion only of these teeth are always firmly engaged, a constant and computable arcuate displacement between tube 40 and gear 45 will result for each complete 360° revolution of the magnetic field.

For each complete revolution of the magnetic field the relative displacement of flexible tube 40 can be easily calculated. When the magnetic field completes one revolution, the rotation of flexible tube 40 will be equal to the difference between the number of teeth 42 carried by tube 40 (200, for example) and the number of teeth on ring gear 45 (202, for example) divided by the number of teeth 42. In this situation tube 40 would rotate through 1/100 of a revolution (202−200 divided by 200). Therefore, if the magnetic field rotates at 3600 r.p.m. then flexible tube 40 will rotate at 3600 r.p.m. multiplied by 1/100 which equals 36 r.p.m. It should be noted that no mechanical component rotates at 3600 r.p.m. and that all rotation is confined to tube 40 which acts as the output element.

Ring gear 45 is connected to flexible tube 40 by way of a harmonic, positive drive arrangement. Referring again to FIG. 2, full tooth engagement is accomplished at diametrically opposed locations while at the intermediate locations there is full tooth disengagement. The engaged teeth 42 of the diametrically opposed deflected sections of tube 40 act as splines or anchors and during revolution of the shifting magnetic field advance into engagement with successive teeth of the rigid gear 45. It can be seen that since such a relatively great number of teeth (approximately 15 percent) are fully engaged at all times, high starting torque and high holding torque can be achieved. Also, changes in the rotational rate, abrupt starting and braking, and, reversals in rotational direction result in virtually no backlash. There is virtually no clearance between the interengaged teeth so that the disadvantages of lost motion and lag suffered by the gear trains of prior art welding torches are eliminated.

Since flexible tube 40 is prevented from axial movement by end stops 61 and 63, its rotary movement is converted into axial movement of hollow worm gear 20. Worm gear 20 is prevented from rotating by diametrically opposed keys 65 and 66 inserted in associated keyways (see FIG. 3) cut in the walls of worm gear 20. As mentioned, rotation of tube 40 in one direction axially displaces worm gear 20 to raise electrode 15 from workpiece W while rotation in the opposite direction axially displaces worm gear 20 to lower electrode 15 toward workpiece W.

Although a particular embodiment has been illustrated to best describe the advantages and unique aspects of the present invention, it is to be understood that the invention is to be limited only by the following claims.

What is claimed is:
1. Apparatus for using the arc gap voltage between the electrode of an electrical arc discharge device and a workpiece to maintain a constant selected arc gap length, the apparatus comprising:
 an electrical arc discharge device including an electrode,
 a feedback line for sensing arc voltage,
 an electric circuit for receiving the arc voltage from the feedback line, the circuit including a first component for comparing the arc voltage with the reference voltage to ascertain voltage differential, a second component for generating electric pulses at a frequency in proportion to the rate of change in voltage differential, and
 an electromechanical actuator connected to the electrical arc discharge device for receiving the pulses and in response thereto moving the electrode to restore the arc gap to the selected length, said actuator comprising a plurality of fixed circularly aligned electromagnets, an annular drive member, said plurality of electromagnets surrounding said drive member, an axially translatable worm gear within the annulus of said drive member and having electrode fixedly connected to the worm gear, means on said drive member for translatably driving said worm gear and means fixed with respect to said electromagnets to prevent rotation of said worm gear, the electric circuit including distributing means for distributing the pulses to the electromagnets so as to generate a magnetic field capable of revolving in opposing directions to rotatively drive said drive member,
 whereby revolution of the magnetic field in one direction results in moving the electrode and said worm gear toward the workpiece and revolution of the magnetic field in the opposing direction results in movement of the electrode and said worm gear away from the workpiece.

2. Apparatus for positionally adjusting an electric arc discharge device so as to maintain a constant selected arc gap length between the electrode of the device and a workpiece, the apparatus comprising:
 an electrical arc discharge device including an electrode,
 a feedback line for sensing arc voltage,
 an electrical circuit for receiving the arc voltage from the feedback line, the circuit serving to generate and transmit electrical pulses to control the arc gap to the selected length,
 a first annular gear having teeth formed on its internal periphery,
 a second annular gear having teeth formed on its exterior periphery of fewer number than the teeth of the first gear, the second gear being positioned to rotate within the first gear,
 means for receiving the electric pulses from the circuit and using the pulses to deflect successive diametrically opposed sections of the second gear, causing the teeth of said sections to intermesh with the first gear to achieve relative rotation between the gears, and
 a coupling for transmitting rotary movement of the second gear to the arc discharge device to restore the arc gap to the selected length.

3. The apparatus according to claim 2 wherein the second annular gear is constructed of magnetizable material, and
 the means for receiving the electrical pulses is constituted by at least two pairs of diametrically opposed electromagnets, successive pairs of which are sequentially energized to generate a revolving magnetic field that causes deflection of the second gear.

4. The apparatus according to claim 2 wherein the coupling comprises a flexible tube on whose exterior surface is mounted the second gear, and an internally threaded nut connected to the device.

5. The apparatus according to claim 4 further comprising a stop for preventing axial movement of the flexible tube.

6. The apparatus according to claim 5 wherein the coupling comprises a worm gear interengaged with the nut whose rotary movement is converted into axial movement by the worm gear and electrode.

7. The apparatus according to claim 6 further comprising a stationary frame connected to the device,
a key fixed to the frame, and
means formed on the exterior surface of the worm gear defining a keyway for receiving the key to thereby prevent rotary movement by the worm gear as it is moved axially.

8. The apparatus according to claim 2 wherein the device is a welding torch.

9. Apparatus for positionally adjusting an electric arc discharge device so as to maintain a constant selected arc gap length between the electrode of the device and a workpiece, the apparatus comprising:
an electric arc discharge device including an electrode,
a feedback line for sensing arc voltage,
an electric circuit for receiving the arc voltage from the feedback line, the circuit including a first component for comparing the arc voltage with a reference voltage to ascertain voltage differential, and, a second component for generating electric pulses at a frequency in proportion to the voltage differential,
a first annular gear having teeth formed on its internal periphery,
a second annular gear having teeth formed on its exterior periphery of fewer number than the teeth of the first gear, the second gear being positioned to rotate within the first gear,
means for receiving the electric pulses from the circuit and using the pulses to deflect successive diametrically opposed sections of the second gear, causing the teeth of said sections to intermesh with the first gear to achieve relative rotation between the gears, and
a coupling for transmitting rotary movement of the second gear to the arc discharge device to restore the arc gap to the selected length.

10. The apparatus according to claim 9 wherein,
the second annular gear is constructed of magnetizable material, the means for receiving the electrical pulses is constituted by at least two pairs of diametrically opposed electromagnets, successive pairs of which are sequentially energized to generate a revolving magnetic field that causes deflection of the second gear, and
the device is a welding torch.

References Cited

UNITED STATES PATENTS

| | | | |
|---|---|---|---|
| 3,356,874 | 12/1967 | Chiapparelli et al. | 310—80 X |
| 3,402,308 | 9/1968 | Henschke et al. | 310—80 |
| 3,418,547 | 12/1968 | Dudler | 318—138 X |
| 3,443,057 | 5/1969 | Allen et al. | 219—131 |

JOSEPH V. TRUHE, Primary Examiner

J. G. SMITH, Assistant Examiner

U.S. Cl. X.R.

219—131; 310—83; 318—138